Patented Dec. 21, 1937

2,103,196

UNITED STATES PATENT OFFICE 2,103,196

INSECTICIDAL OIL SPRAY

Hugh Knight, Claremont, Calif., assignor to Emulsoids, Inc., San Francisco, Calif., a corporation of Delaware No Drawing. Application May 2, 1935
Serial No. 19,467

7 Claims. (Cl. 167—43)

This invention relates to insecticidal oil sprays and it pertains more particularly to sprays for use on sensitive green foliage for combatting insect pests and parasites.

The object of my invention is to increase the efficiency and effectiveness of oil sprays and to decrease the danger of injury to foliage. A further object is to provide an oil composition which will be extremely toxic to insects. A further object is to provide such a material which is preferentially oil soluble so that when the oil spray is applied in the form of an emulsion the poison will be retained in the oil film on plant leaves instead of being lost with the water which runs off the leaves. A further object is to provide a poison which will tend to prevent the penetration of oil into plant leaves. A further object is to provide a toxic material which is oil soluble and which has desirable emulsifying properties,—one which will insure the desired dispersion of oil in water, which will make the emulsion quick breaking, and which will insure the desired uniform oil deposit on plant leaves when the emulsion is sprayed onto foliage. Further objects will be apparent as the detailed description of my invention proceeds.

I have discovered that the use of very small amounts of naphthenic acids in mineral oil sprays accomplishes all of the objects hereinabove set forth. Naphthenic acids have been heretofore considered as a dangerous impurity in mineral oil sprays because of their harmful effect on foliage. I have discovered that these acids may be used in very small concentrations with amazing effectiveness and without giving any sign of plant injury. I have discovered that some naphthenic acids are very much more effective than others from the standpoint of toxicity and that the most potent acids are those derived from relatively low-boiling naphthenic mineral oils, oils of about the kerosene range. These particular naphthenic acids are characterized by a high organic acidity. My preferred naphthenic acids have an organic acidity of from 200 to 250 milligrams of potassium hydroxide per gram. Naphthenic acids extracted from oils of lubricating range may have organic acidities as low as about 15 to 40 milligrams of KOH per gram and although they are much more inert as toxic agents, they are better emulsifiers than the acids obtained from the oils of the kerosene range. This number of milligrams of potassium hydroxide per gram of material is commonly referred to as the "acid number" and I have found that the acid number is an extremely important index of the toxicity of naphthenic acids.

By the term "toxicity" I do not refer to the killing power of the oil, but rather to the killing power of the toxic material which is added to the oil. Oil may kill insects by suffocation. One oil emulsion may give a higher kill than another emulsion because of the fact that the oil is more effectively liberated on the leaves; a material which merely liberates more oil or liberates the oil in more effective form can not properly be called a toxic material because in this case the oil acts by suffocation and the added material only functions to control the surface tension thereof with respect to water or to plant leaves. By the term "toxicity" as employed herein, I mean that property of killing insects by its chemical action or by its paralyzing effect.

The toxicity of a substance which is employed in a tree spray oil can not be determined by tests in which there are uncontrolled variables such as stability of emulsions, thoroughness of spray coverage, climatic conditions, amount and kind of release of oil on plant foliage, etc. I have found that the only sure way of testing the toxicity of a substance for use in oil sprays is to immerse insects in a given spray oil and to immerse a like number of similar insects under the same conditions in the same quantity of the same oil to which has been added a given amount of the toxic material to be tested.

In a series of tests I used Standard Oil Company (Indiana) L53 white oil, which has an unsulfonatable residue of about 96% and a viscosity of about 80 seconds Saybolt at 100° F. To different samples of this oil I added materials to be tested for toxicity usually in amounts of from 1% to 5%. The poisons included those considered by the art to be most effective, such as pyrethrum, derris extract, croton oil, copper naphthenate, butyl alcohol, etc. I also tested out a number of materials which have not heretofore been used in oil sprays, including nicotine salicylate, naphthenic acids, Halowax, etc.

This oil and these solutions were poured into marked watch glasses and 10 to 20 insects were immersed in the oil in each watch glass and observed at frequent intervals with a microscope. In most of these tests I used mealy bugs (P. aurilanatus, citrophilus, etc.), since I found that mealy bugs were more susceptible than black scale, citracola scale, etc. These insects belong to the family Coccidae; within this family the effects of one insecticide are similar, although there is a difference between species.

In the 80 viscosity white oil I found that insects were alive after 96 hours. Using added poisons in the amount of 2% I obtained the following results:

*Derris.*—Extract insoluble in oil, some toxicity, probably due to pine oil carrier.

*Pyrethrum.*—All insects alive after 48 hours.

*Butanol.*—Very toxic but too volatile for use in tree sprays.

*Croton oil.*—Increases toxicity, but layers out of the oil.

*Glyceryl oleate.*—All insects dead within 6 hours.

*Aluminum oleate.*—Insects alive after 48 hours.

*Copper naphthenate.*—Insects alive after 24 hours.

*Aluminum naphthenate.*—All insects dead within 6 hours.

*Aluminum naphthenate with added glyceryl oleate.*—All insects dead within three hours.

*Glyceryl oleate containing a small amount of nicotine salicylate (1:1000 based on oil).*—Insects paralyzed immediately. All movement ceased within 5 minutes. Dead in less than half hour.

*Naphthenic acid.*—All insects paralyzed immediately, all movement ceasing within 5 minutes. Dead in less than half hour.

A similar group of toxicity tests were run with a refined mineral seal oil having a viscosity of about 40 seconds at 100° F. In this oil the insects were alive after 24 hours, but were dead within 48 hours. Similar results were obtained on a long list of known poisons. The mixture of glyceryl oleate with aluminum naphthenate gave a complete kill in 2½ hours. In these tests I found that glyceryl naphthenate was quite toxic, killing all insects in from 1 to 2 hours, that glycol mono oleate killed all insects in 5 hours, and that glycol naphthenate was likewise an effective toxic material. Here again the nicotine salicylate was far more effective than poisons heretofore used in tree sprays and naphthenic acids were even more remarkable in their phenomenal toxic properties.

Naphthenic acids have been considered injurious to plant leaves and I therefore conducted tests to determine whether or not this toxic material could be safely used in effective amounts on sensitive foliage. I found that it may be present in amounts up to 4% on citrus and Kaentia palms, also on tangerines which are known to be extremely sensitive. It is usually not necessary to use more than 2% and I have found that amounts varying from .1% to 1% (based on oil) are effective to obtain practically a complete kill of scale, mealy bugs, etc. Using a 1% solution the insects are killed within a few minutes and using a .1% solution the insects are probably all killed within about 6 hours. These insects appear to be immediately paralyzed and it is therefore difficult to determine accurately how long it takes to effect a kill. My observations on the larva of Cryptolaemus, which is very active, indicate that immediately on immersion the wax is dissolved, leaving the insect unprotected and killing the insect within a hour, at which time it turns black and starts to decompose.

The effectiveness of naphthenic acid as a toxic material may be shown in tests on lemons infested with red scale. In these tests I employed a 2% solution of aluminum oleate in perfection kerosene and dissolved 1% of naphthenic acid in this solution. As compared with a blank showing a kill of 60%, this spray effected a kill of 94.8%.

Naphthenic acid has likewise proved its remarkable toxicity and its safety in field applications on citrus trees and in applications to sensitive nursery plants.

Naphthenic acid is not only exceedingly toxic to insects, but it raises the angle of contact of the oil and retards the penetration of the oil into plant leaves. In a series of tests on potted citrus plants using a refined mineral seal oil emulsified in water (4% concentration) by means of calcium caseinate, I found that oil disappeared from the leaf surface in 3 days when it contained no naphthenic acid, but it remained on the leaf 7 or 8 days without producing any injury when the oil contained 4% naphthenic acid. The angle of contact of the mineral seal oil was 24.5°. The same oil with 10% naphthenic acid had an angle of contact of 28.5°. These acids can not be used in spray oils in quantities as great as 4% to 10%, but even smaller amounts of the naphthenic acids apparently have some effect in the direction indicated.

As I have already indicated, it appears that the particular type of naphthenic acids is quite important in determining its insecticidal efficiency. I have found that the naphthenic acids from the kerosene fraction of naphthenic crudes gives excellent results and that the naphthenic acids from the gasoline and gas oil fractions are likewise very good. Naphthenic acids from lubricating oil fractions do not exhibit this unusual toxicity. If it is assumed that each molecule of the naphthenic acids contains a single carboxyl group, then the average molecular weight of the naphthenic acids should be about 150 to 250, preferably about 170 to 210; acids having a molecular weight as high as 350 are found to be lacking in the extraordinary toxicity, but they may be employed as emulsifiers.

Another distinguishing characteristic of the toxic naphthenic acids is their acid number which, as above stated, should be from about 200 to 500, although in some cases it may be as low as 150 (milligrams of potassium hydroxide per gram of sample); oils with extremely low acid numbers are relatively worthless as toxics.

The oils which I employ may vary from kerosene to viscous oils upward of 100 seconds Saybolt at 100° F. and for use on sensitive foliage I prefer to use white oils or at least pale oils (oils which have been acid treated to remove unsaturates and impurities which may cause plant injury). The naphthenic acids may be from various sources, particularly from Rumanian crudes or from naphthenic crudes of California; in addition to the particular fraction and acid numbers and molecular weights, the naphthenic acid should be substantially free from tarry matter and should be soluble in the oil. Indeed, one of the outstanding features of the invention is the fact that the naphthenic acids are preferentially oil soluble so that they are not lost with the run-off water when the oil is applied in the form of an aqueous emulsion.

As a specific example of my invention, the following formula has been extensively used with uniformly successful results against red scale, mealy bugs, and other plant parasites on Kaentia palms, citrus trees, tangerines, and nursery plants:

| | Percent |
|---|---|
| Refined mineral seal oil (40 to 50 seconds Saybolt at 100° F.) | 97.25 |
| Naphthenic acid | .5 |
| Aluminum naphthenate (or oleate, etc.) | 2.0 |
| Glyceryl oleate | .25 |

The naphthenic acid can be increased or decreased from about .1% to 2.0%. The glyceryl oleate may be either the mono-oleate or dioleate; likewise, glycol mono-oleate or other hydroxy esters of high molecular weight acids may be used. This particular formula is a so-called "soluble" oil because its ingredients are all soluble in the oil so that it has the appearance of being a simple oil, yet when it is agitated in water in a spray rig it is readily emulsified to give the desired quick breaking emulsion. This oil is usually applied in concentrations of about 1% to 2% based on water.

Another preferred example using the same oil is:

|  | Percent |
|---|---|
| Mineral seal oil | 99 |
| Glycol mono-oleate | 0.5 |
| Naphthenic acid | 0.5 |

For codling moth on apples it may be desirable to employ a more viscous oil with more emulsifer and to apply the oil in somewhat lower concentration using, however, about the same amount of naphthenic acids. For example, I may use the following formula:

|  | Percent |
|---|---|
| Straw oil or technical white oil (about 80 seconds Saybolt at 100° F.) | 94.5 |
| Naphthenic acid | 0.5 |
| Glycol mono-oleate | 2.5 |
| Aluminum naphthenate | 2.5 |

I have found that Eastern oils are more persistent than Western oils of corresponding viscosity and I attribute this phenomenon to the fact that Eastern oils are as a rule more paraffinic. Consequently, I may use lower oil concentrations or lower viscosities of Eastern oils than would be possible with Western oils. Excellent results may be obtained by blending light paraffinic Eastern oils with heavier refined Western oils, said blends ranging in viscosity from about 40 to 80 or 100 seconds Saybolt at 100° F.

While I have described my invention as applied to the so-called "soluble" or "self emulsifiable" oils, it should be understood that the invention is equally applicable to oil sprays which are applied in the absence of an aqueous carrier, such as by direct spraying or by fogging. Also, the invention is applicable to the use of mineral oils made up into emulsions of the mayonnaise type or mineral oils which are emulsified by the so-called "tank-mix" methods using calcium caseinate, etc. as emulsifiers.

While I have described preferred examples of my invention, it should be understood that I do not limit myself to any of the described details except as defined by the following claims which should be construed as broadly as the prior art will permit.

I claim:

1. An insecticidal oil spray which comprises a paraffinic mineral oil containing about .1% to 2.0% of naphthenic acids having an acid number of at least 150.

2. An insecticidal oil spray which comprises a paraffinic mineral oil containing about .1% to 2.0% of naphthenic acids having a molecular weight (assuming one carboxyl group per molecule) of about 150 to 250.

3. An insecticidal oil spray which comprises a paraffinic mineral oil containing about .1% to 2.0% of naphthenic acids having an acid number of at least 150 and the molecular weight (assuming one carboxyl group per molecule) of about 150 to 250.

4. An insecticidal oil comprising a refined mineral oil having a viscosity of about 40 to 80 seconds Saybolt at 100° F. and having dissolved therein about .1% to 2% of a naphthenic acid derived from that fraction of a naphthenic crude which falls within the gasoline to gas oil boiling range.

5. A mineral oil spray which comprises a refined mineral oil of about 40 to 80 seconds Saybolt viscosity at 100° F. which contains in solution about .1% to 2% of toxic naphthenic acids, together with an oil soluble emulsifier which comprises a hydroxy ester of a high molecular weight organic acid.

6. An oil spray base for emulsification in from 50 to 100 parts of water without the use of additional emulsifying agents which consists essentially of a refined petroleum oil having a viscosity of about 40 to 80 seconds Saybolt at 100° F. containing an oil soluble emulsifier and about .1% to 2.0% of toxic naphthenic acids.

7. A tree spray composition comprising about 95% to 99% of paraffinic mineral oil, about .1% to 2.0% of toxic naphthenic acid, and about .5% to 4.5% oil soluble emulsifier.

HUGH KNIGHT.